(12) United States Patent
Zheng et al.

(10) Patent No.: US 9,317,318 B2
(45) Date of Patent: Apr. 19, 2016

(54) VIRTUAL MACHINE MONITOR CONFIGURED TO SUPPORT LATENCY SENSITIVE VIRTUAL MACHINES

(71) Applicant: VMware, Inc., Palo Alto, CA (US)

(72) Inventors: Haoqiang Zheng, Mountain View, CA (US); Lenin Singaravelu, Sunnyvale, CA (US); Shilpi Agarwal, San Mateo, CA (US); Daniel Michael Hecht, San Francisco, CA (US); Garrett Smith, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 25 days.

(21) Appl. No.: 14/468,122

(22) Filed: Aug. 25, 2014

(65) Prior Publication Data
US 2015/0058846 A1    Feb. 26, 2015

Related U.S. Application Data

(60) Provisional application No. 61/870,143, filed on Aug. 26, 2013.

(51) Int. Cl.
*G06F 9/455* (2006.01)
*H04L 12/875* (2013.01)
*H04L 12/26* (2006.01)
(Continued)

(52) U.S. Cl.
CPC ........ *G06F 9/45558* (2013.01); *G06F 9/45533* (2013.01); *G06F 9/5033* (2013.01); *G06F 9/5088* (2013.01); *G06F 13/24* (2013.01); *H04L 43/0894* (2013.01); *H04L 43/16* (2013.01); *H04L 47/56* (2013.01); *H04L 47/801* (2013.01);
(Continued)

(58) Field of Classification Search
CPC .................................................. G06F 9/45533
USPC ............................................................. 718/1
See application file for complete search history.

(56) References Cited

U.S. PATENT DOCUMENTS 7,765,543 B1 *  7/2010  Weissman ............... G06F 9/485
                                                                714/48
8,166,485 B2     4/2012  Krishnakumar et al.
(Continued)

OTHER PUBLICATIONS

Sean K. Barker et al., "Empirical Evaluation of Latency-sensitive Application Performance in the Cloud", Feb. 23, 2010, MMSys'10, pp. 1-12.*

(Continued)

*Primary Examiner* — Wei Zhen
*Assistant Examiner* — Lanny Ung
(74) *Attorney, Agent, or Firm* — Patterson & Sheridan, LLP

(57) ABSTRACT

A host computer has a virtualization software that supports execution of a plurality of virtual machines, where the virtualization software includes a virtual machine monitor for each of the virtual machines, and where each virtual machine monitor emulates a virtual central processing unit (CPU) for a corresponding virtual machine. A virtual machine monitor halts execution of a virtual CPU of a virtual machine by receiving a first halt instruction from a corresponding virtual machine and determining whether the virtual machine is latency sensitive. If the virtual machine is latency sensitive, then a second halt instruction is issued from the virtual machine monitor to halt a physical CPU on which the virtual CPU executes. If the virtual machine is not latency sensitive, then a system call to a kernel executing on the host computer is executed to indicate to the kernel that the virtual CPU is in an idle state.

20 Claims, 4 Drawing Sheets

(51) Int. Cl.
*H04L 12/927* (2013.01)
*G06F 13/24* (2006.01)
*G06F 9/50* (2006.01)

(52) U.S. Cl.
CPC ......... *G06F 9/50* (2013.01); *G06F 2009/45575* (2013.01); *G06F 2209/5017* (2013.01)

(56) References Cited

U.S. PATENT DOCUMENTS

| | | | |
|---|---|---|---|
| 8,364,997 B2 * | 1/2013 | Tian | G06F 1/3203 713/322 |
| 8,943,252 B2 | 1/2015 | Waters et al. | |
| 2007/0150898 A1 | 6/2007 | Duda et al. | |
| 2010/0125843 A1 | 5/2010 | Saito et al. | |
| 2010/0229173 A1 | 9/2010 | Subrahmanyam et al. | |
| 2011/0197003 A1 | 8/2011 | Serebrin et al. | |
| 2011/0247001 A1 | 10/2011 | Smith et al. | |

OTHER PUBLICATIONS

Adit Ranadive et al., "ResourceExchange: Latency-Aware Scheduling in Virtualized Environments with High Performance Fabrics", 2011, IEEE, pp. 45-53.*

Cong Xu et al., "vSlicer: Latency-Aware Virtual Machine Scheduling via Differentiated-Frequency CPU Slicing", 2012, Purdue University Purdue e-Pubs, pp. 1-14.*

"Best Practices for Performance Tuning of Latency-Sensitive Workloads in vSphere Virtual Machines," VMware Technical White Paper, May 15, 2013, pp. 1-9, available at: http://web.archive.org/web/20130515013812/http://www.vmware.com/files/pdf/techpaper/VMW-Tuning-Latency-Sensitive-Workloads.pdf.

"What's New in VMware vSphere 5.1—Performance" VMware Technical Marketing Documentation, V 1.0 / Oct. 2012, Aug. 9, 2013, pp. 1-17, available at: http://web.archive.org/web/20130809042604/http://www.vmware.com/files/pdf/techpaper/Whats-New-VMware-vSphere-51-Performance-Technical-Whitepaper.pdf.

"Network I/0 Latency on VMware vSphere 5—Performance Study" VMware Technical White Paper, May 31, 2013, pp. 1-15, available at: http://web.archive.org/web/20130531071037/http://www.vmware.com/files/pdf/techpaper/network-io-latency-perf-vsphere5.pdf.

Alizadeh et al, "Less is More: Trading a little Bandwidth for Ultra-Low Latency in the Data Center" USENIX Apr. 11, 2013, pp. 1-14.

Singaravelu, "Performance and Use Cases of VMware DirectPath I/0 for Networking" VMware VROOM! Blog Dec. 6, 2010, pp. 1-8, available at: http://blogs.vmware.com/performance/2010/12/performance-and-use-cases-of-vmware-directpath-io-for-networking.html.

Li et al, "Affinity-Aware Dynamic Pinning Scheduling for Virtual Machines" 2nd IEEE International Conference on Cloud Computing Technology and Science, Nov. 30, 2010, pp. 242-249.

International Search Report mailed Dec. 3, 2014 in counterpart PCT Application PCT/US2014/052555.

International Search Report mailed Dec. 11, 2014 in counterpart PCT Application PCT/US2014/052557.

International Search Report mailed Nov. 6, 2014 in counterpart PCT Application PCT/US2014/052560.

International Search Report mailed Nov. 10, 2014 in counterpart PCT Application PCT/US2014/052564.

* cited by examiner

| Latency Sensitivity Table 155 | | |
|---|---|---|
| VM ID $210_1$ | Latency Sensitivity Indicator = N | Entitlement = 40% |
| VM ID $210_2$ | Latency Sensitivity Indicator = Y | Entitlement = 100% |

VIRTUAL MACHINE MONITOR CONFIGURED TO SUPPORT LATENCY SENSITIVE VIRTUAL MACHINES

CROSS REFERENCE TO OTHER APPLICATIONS

This application claims priority to U.S. Provisional Patent Application No. 61/870,143, entitled "TECHNIQUES TO SUPPORT HIGHLY LATENCY SENSITIVE VMs," filed Aug. 26, 2013, the contents of which is incorporated herein by reference. This application is related to: U.S. patent application Ser. No. 14/468,121, entitled "CPU Scheduler Configured to Support Latency Sensitive Virtual Machines", filed Aug. 25, 2014; U.S. patent application Ser. No. 14/468,181, entitled "Networking Stack of Virtualization Software Configured to Support Latency Sensitive Virtual Machines", filed Aug. 25, 2014; and U.S. patent application Ser. No. 14/468, 138, entitled "Pass-through Network Interface Controller Configured to Support Latency Sensitive Virtual Machines", filed Aug. 25, 2014, the entire contents of which are incorporated herein by reference.

BACKGROUND

Applications characterized as "latency sensitive" are, typically, highly susceptible to execution delays and jitter (i.e., unpredictability) introduced by the computing environment in which these applications run. Examples of latency sensitive applications include financial trading systems, which usually require split-second response time when performing functions such as pricing securities or executing and settling trades.

One source of execution delay is the system kernel, specifically, the kernel scheduler that runs therein. The scheduling and de-scheduling of system and user tasks contributes to latency in a number of ways. First, tasks that are scheduled for execution may spend a non-trivial amount of time in a queue for a particular central processing unit (CPU) before the tasks are dispatched for execution on that CPU. Further, the tasks, once executing, may be preempted by higher priority tasks.

When a virtual CPU (which emulates a physical CPU for a virtual machine) is halted by a virtual machine's guest operating system, the execution of the virtual CPU is, in turn, halted on a physical CPU. This is usually achieved by the kernel scheduler preempting the execution of the virtual CPU on some physical processor, and queueing the task corresponding to the virtual CPU for later execution. When the virtual CPU becomes ready to run again, the virtual CPU task is typically placed into a run queue of the same or other CPU for subsequent execution on that CPU. The intervention by the kernel scheduler to both preempt the virtual CPU and to requeue the virtual CPU when the virtual CPU becomes ready to run is a source of latency, which can cause problems for latency sensitive applications executing on the preempted virtual CPU.

SUMMARY

A method of halting execution of a virtual CPU of a virtual machine on a host computer is provided, where the host computer has a virtualization software that supports execution of a plurality of virtual machines, and where the virtualization software includes a virtual machine monitor for each of the virtual machines, each virtual machine monitor emulating a virtual central processing unit (CPU) for a corresponding virtual machine. The method comprises the steps of receiving a first halt instruction at a virtual machine monitor from a corresponding virtual machine and determining, by the virtual machine monitor, whether the virtual machine is latency sensitive. The method further comprises the step of, if the virtual machine is latency sensitive, issuing from the virtual machine monitor a second halt instruction to halt a physical CPU on which the virtual CPU executes. The method further comprises the step of, if the virtual machine is not latency sensitive, then executing a system call to a kernel executing on the host computer to indicate to the kernel that the virtual CPU is in an idle state.

Further embodiments provide a non-transitory computer-readable medium that includes instructions that, when executed, enable a host computer to implement one or more aspects of the above method, as well as a virtualized computing system that includes a host computer, a kernel scheduler, and a virtual machine monitor that is configured to implement one or more aspects of the above method.

BRIEF DESCRIPTION OF THE DRAWINGS

FIG. 2 is a block diagram that depicts a table for storing latency sensitivity information, according to embodiments.

DETAILED DESCRIPTION

Figure 1:
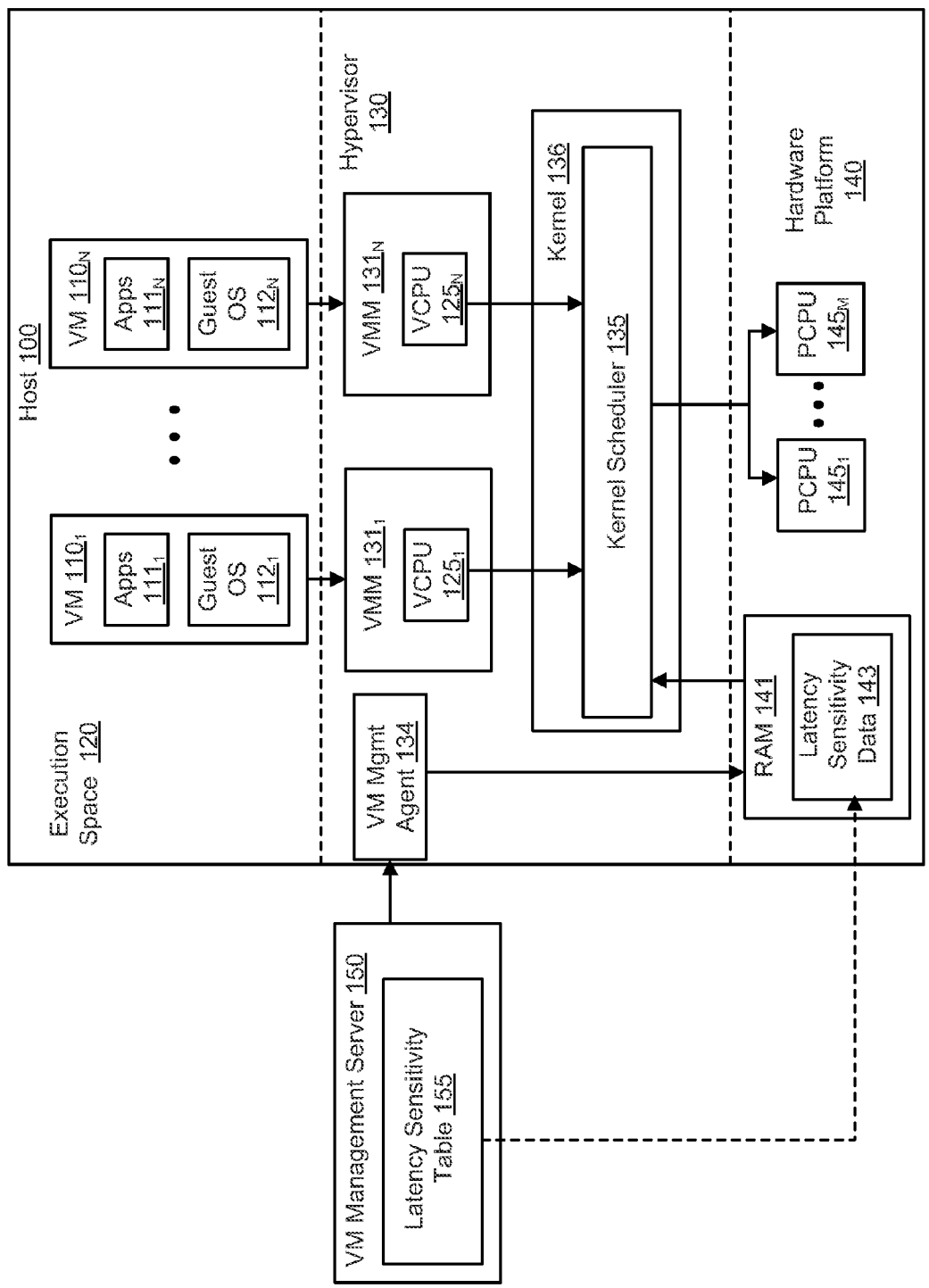
FIG. 1 is a diagram depicting a virtualized computing environment in which one or more embodiments may be implemented.

FIG. 1 depicts a virtualized computing environment in which one or more embodiments may be implemented. As shown, the computing environment includes a host computer 100 and a virtual machine (VM) management server 150. VM management server 150 communicates with host computer 100 over a local connection or, alternatively, over a remote network connection.

Host computer 100 is, in embodiments, a general-purpose computer that supports the execution of an operating system and one or more application programs therein. In order to execute the various components that comprise a virtualized computing platform, host computer 100 is typically a server class computer. However, host computer 100 may also be a desktop or laptop computer.

As shown in FIG. 1, host computer 100 is logically divided into three components. First, execution space 120 supports the execution of user-level (i.e., non-kernel level) programs. User-level programs are non-privileged, meaning that they cannot perform certain privileged functions, such as executing privileged instructions or accessing certain protected regions of system memory. Among the programs that execution space 120 supports are virtual machines.

Virtual machines are software implementations of physical computing devices and execute programs much like a physical computer. In embodiments, a virtual machine implements, in software, a computing platform that supports the execution of software applications under the control of a guest operating system (OS). As such, virtual machines typically emulate a particular computing architecture. In FIG. 1, execution space 120 includes VMs $110_1$-$110_N$. Each VM 110 shown supports the execution of one or more applications 111, each of which executes under the control of a particular guest OS 112. Applications 111 are user-level (non-kernel) programs, such as, for example, word processors or spreadsheet programs. Each of the depicted guest OS' 112 may be one of the well-known commodity operating systems, such as any of the versions of the Windows® operating system from Microsoft Corp., the Linux® operating system, or MacOS® X from Apple, Inc. It should be noted that the applications and guest OS' may vary from one VM to another. Thus, applications $111_1$ in VM $110_1$ may include Microsoft's Word® and Excel® applications running under the control of Windows® 7 as guest OS $112_1$. By contrast, applications $111_N$ in VM $110_N$ may include the Safari® web browser running under the control of MacOS® X as guest OS $112_N$. As shown in FIG. 1, each of VMs $110_1$-$110_N$ communicates with a hypervisor component, referred to herein as hypervisor 130.

Hypervisor 130, as depicted in FIG. 1, provides the operating system platform for running processes on computer host 100. Hypervisor 130 controls all hardware devices within computer host 100 and manages system resources for all applications running therein. Among the core functions that hypervisor 130 provides are console services, file system services, device drivers, and resource scheduling. Further, hypervisor 130 implements software components that provide for the instantiation of one or more virtual machines on the host computer.

As depicted in the embodiment of FIG. 1, hypervisor 130 includes virtual machine monitors (VMMs) $131_1$-$131_N$. Each VMM 131 corresponds to an executing VM 110. Thus, VMM $131_1$ corresponds to VM $110_1$, VMM $131_2$ corresponds to VM $110_2$, and so on. Each VMM 131 is a software layer that provides a virtual hardware platform to the guest OS for the corresponding virtual machine. It is through a particular VMM 131 that a corresponding VM accesses services provided by the kernel component of hypervisor 130 (shown in FIG. 1 as kernel 136). Among the functions carried out by kernel 136 are memory management, providing networking and storage stacks, and process scheduling.

Each VMM 131 in FIG. 1 implements a virtual hardware platform for the corresponding VM 110. Among the components of the implemented virtual hardware platform are one or more virtual central processing units (or VCPUs) 125. In FIG. 1, VMM $131_1$ implements a VCPU $125_1$, VMM $131_2$ implements VCPU $125_2$, and so on. Each VCPU 125 appears as a physical CPU from the standpoint of the applications 111 and the guest OS 112 that run in the corresponding VM 110. In this way, a virtualized guest operating system that runs within a virtual machine may schedule and dispatch processes for execution on one or more virtual CPUs in the same way that an operating system that runs directly on a computer host (i.e., in a non-virtualized manner) schedules and dispatches processes for execution on physical CPUs. However, from the standpoint of hypervisor 130 (which, in typical embodiments, executes directly on computer host 100), each VCPU 125 is a process to be scheduled and dispatched on a physical CPU of computer host 100.

The guest operating systems executing in the virtual machines that correspond to the VMMs (e.g., Windows or Linux) may determine that there are no longer any tasks to run. For example, a virtual machine may have executing therein a spreadsheet or word processing application. When those applications are terminated, and no other applications are started, the guest operating system may determine that, in order to save power, one or more CPUs (i.e., virtual CPUs for the corresponding virtual machine) should be quiesced. In order to quiesce the virtual CPUs, the guest operating system may execute a "halt" instruction (e.g., the HLT instruction that is part of the x86 architecture). In other cases, the guest operating system may issue a monitored wait (e.g., MWAIT) instruction, where the CPU halts processing at a predefined instruction address. In either case, the CPU ceases processing and enters an idle state. In one or more embodiments, the CPU returns from the idle state when an interrupt to the CPU is received. The VMMs (such as VMMs 131) emulate the quiescing (or halting) of the virtual CPUs such that the halted virtual CPUs appear as quiesced physical CPUs to the guest operating system executing in a corresponding virtual machine.

In one or more embodiments, kernel 136 serves as a liaison between VMs 110 and the physical hardware of computer host 100. Kernel 136 is a central operating system component, and executes directly on host 100. In embodiments, kernel 136 allocates memory, schedules access to physical CPUs, and manages access to physical hardware devices connected to computer host 100.

Kernel 136 also includes a kernel scheduler 135. Kernel scheduler 135 is responsible for scheduling tasks for execution on the physical CPUs of computer host 100. It should be noted that all tasks that execute on computer host 100 share its underlying hardware resources. This includes random access memory, external storage, and processing time on the physical CPUs. Thus, the tasks that kernel scheduler 135 schedules for processing include VCPUs 125 (which are the virtual CPUs of executing VMs), as well as non-virtualized standalone applications, kernel threads, and interrupt handlers. In embodiments, kernel scheduler 135 maintains a separate run queue for each physical CPU (not shown). That is, kernel scheduler 135 schedules a process for execution on a particular physical CPU by placing that process in the run queue for that particular physical CPU. Typically, a physical CPU only selects processes from its own queue for execution thereon.

However, it is possible for one physical CPU to become idle while other physical CPUs have jobs waiting in their corresponding run queues. Thus, periodically, kernel scheduler 135 rebalances the queues. That is, if the run queue of a particular physical CPU contains a large number of tasks, kernel scheduler 135 moves some of the tasks therein to run queues of physical CPUs that are less busy.

FIG. 1 also depicts hardware platform 140, which is another component of computer host 100. Hardware platform 140 includes all physical devices, channels, and adapters of computer host 100. Hardware platform 140 includes network adapters (not shown), for network communication, as well as host bus adapters (HBAs) (not shown), which enable communication with external storage devices. In addition, hardware platform 140 includes the physical CPUs (referred to herein as PCPUs) of computer host 100. As shown in FIG. 1, computer host 100 has M PCPUs $145_1$-$145_M$. As shown by the figure, kernel scheduler 135 schedules and dispatches tasks for execution on one or more PCPUs 145.

Hardware platform 140 also includes a random access memory (RAM) 141, which, among other things, stores programs currently in execution, as well as data required for such programs. Moreover, the aforementioned run queues that kernel scheduler 135 maintains for each PCPU are typically maintained in RAM 141.

In order to support the configuration, identification, and processing changes needed for executing highly latency sensitive virtual machines, the embodiment depicted in FIG. 1 includes a VM management server 150. VM management server 150 is, in embodiments, a server application executing either within computer host 100, or (as shown in FIG. 1) remotely from computer host 100. Embodiments of VM management server 150 provide an interface (such as a graphical user interface (or GUI)) through which a system administrator may define, configure, and deploy virtual machines for execution on one or more host computers.

In addition, VM management server 150 provides for the configuration of virtual machines as highly latency sensitive virtual machines. According to one or more embodiments, VM management server 150 maintains a latency sensitivity table 155, which defines latency sensitivity characteristics of virtual machines. Latency sensitivity table 155 is described in further detail below.

As shown in FIG. 1, VM management server 150 communicates with computer host 100, either through a direct local connection or over a computer network. In order to facilitate such communication, VM management agent 134 executes on computer host 100. Although VM management agent 134 is not part of kernel 136, embodiments of the agent run at the hypervisor level within hypervisor 130. However, in other embodiments, VM management agent 134 may run as a user program within execution space 120. It should be noted that the processes of VM management agent 134 are also scheduled for execution by kernel scheduler 135.

VM management agent 134 receives instructions from VM management server 150 and carries out tasks on behalf of VM management server 150. Among the tasks performed by VM management agent 134 are configuration and instantiation of virtual machines. One aspect of the configuration of a virtual machine is whether that virtual machine is highly latency sensitive. Thus, VM management agent 134 receives a copy of latency sensitivity table 155 and saves the underlying data within RAM 141 as latency sensitivity data 143. As shown in FIG. 1, once latency sensitivity data 143 is saved to RAM, kernel scheduler 135 then accesses that information in order to determine which virtual machines are highly latency sensitive. Upon determining that one or more virtual machines are highly latency sensitive, kernel scheduler 135 makes certain scheduling changes in order to accommodate the needs of these virtual machines.

FIG. 2 is a block diagram that depicts one embodiment of latency sensitivity table 155. As shown in the figure, latency sensitivity table 155 stores multiple rows of data, where each row corresponds to a particular virtual machine within host 100. Each virtual machine is identified on the host by a unique VM ID 210. A VM ID 210 may be any unique binary or alphanumeric value that is associated with a virtual machine. As shown in FIG. 2, latency sensitivity table 155 has entries for VM IDs 210₁ and 210₂, which correspond, respectively, to the virtual machines VM 110₁ and VM 110₂ depicted in FIG. 1.

For each VM ID 210, latency sensitivity table 155 stores two values. A first value is a latency sensitivity indicator. This indicator may take on two distinct values (such as Y or N), which indicates whether the corresponding virtual machine is highly latency sensitive. In other embodiments, the latency sensitive indicator may take on more than two values (e.g., High, Medium, Low, or Normal), to provide for specifying different degrees of latency sensitivity for the corresponding virtual machine. In FIG. 2, VM ID 210₁ (corresponding to VM 110₁) identifies a virtual machine that is not latency sensitive because its latency sensitivity indicator is set to N. On the other hand, VM ID 210₂ (which corresponds to VM 110₂) identifies a virtual machine that is latency sensitive because its corresponding latency sensitivity indicator is set to Y. For example, VM 110₂ might be a virtual machine that runs a real-time financial trading application, while VM 110₁ might be a virtual machine that runs a batch processing application (such as a billing system), which typically does not require split-second response time, and is generally unaffected by the jitter that might occur in a virtualized computing environment.

The second value that latency sensitivity table 155 stores is an "entitlement" value. The CPU resource entitlement for a virtual machine may be adjusted by specifying a CPU reservation value, a CPU limit value, and a CPU shares value. A CPU reservation value represents a guaranteed minimum allocation of CPU resources for the virtual machine. By contrast, a CPU limit value represents a maximum allocation of CPU resources for the virtual machine. Finally, a CPU shares value represents an amount of CPU resources that a virtual machine is allocated relative to an amount of CPU resources allocated to other virtual machines. Thus, with a CPU shares allocation, the CPU entitlement for a virtual machine may change dynamically as other virtual machines are powered on, powered off, or have their own CPU shares values configured.

In the embodiment shown in FIG. 2, the entitlement value is a percentage. In this embodiment, the entitlement value represents a reserved percentage of CPU resources for the virtual CPUs of a given VM (i.e., a CPU reservation value). That is, the reservation represented by an entitlement value specifies a guaranteed minimum allocation for the corresponding virtual machine. According to embodiments, a virtual machine may be powered on only if there are enough unreserved CPU resources available to satisfy the reservation of the virtual machine. It should be noted that the entitlement value is not limited to being expressed as a percentage. In other embodiments, the entitlement value may be represented as a number of reserved CPU cycles (such as a certain fraction of a processor's speed in gigahertz (GHz)).

In FIG. 2, VM 110₁ (as identified by VM ID 210₁) has an entitlement value of 40 percent (%), which means that 40% of a physical CPU is reserved to the VCPU (i.e., VCPU 125₁) associated with VM 110₁. It should be noted that, in this example, it is assumed that VM 110₁ only has a single VCP 125. If, however, VM 110₁ has more than one VCPU, then each of those VCPUs would share 40% of the reserved capacity of a single physical CPU.

Referring to FIG. 2, VM 110₂ (as identified by VM ID 210₂) has a corresponding entitlement value of 100%. Thus, the host will reserve 100% of the capacity of a physical CPU for VM 110₂.

According to one or more embodiments, if a virtual machine is both highly latency sensitive and has a maximum entitlement value, then that virtual machine is granted exclusive affinity to one or more physical CPUs. For example, assuming that VM 110₂ has one virtual CPU VCPU 125₂, then VM 110₂ (or, more specifically, VCPU 125₂) is given exclusive affinity to one physical CPU in computer host 100 (i.e., one of PCPUs 145₁-145ₘ). On the other hand, if VM 110₂ has two virtual CPUs, then, in order for both virtual CPUs to be given exclusive affinity to a physical CPU, then the entitlement value in latency sensitivity table 155 for VM ID 210₂ is set to 200% (i.e., 100% reservation for each virtual CPU in the set of VCPUs 125₂ corresponding to VM 110₂).

When a virtual CPU of a virtual machine has exclusive affinity to a physical CPU, the physical CPU is, effectively, dedicated to running that particular virtual CPU. That is, the kernel scheduler (i.e., kernel scheduler 135) will refrain from scheduling any processes for execution on the physical CPU to which the virtual CPU has exclusive affinity, even in cases where the physical CPU is in an idle state. Further, kernel scheduler 135 will refrain from scheduling most interrupt processing on the physical CPU. Instead, interrupt processing is scheduled and dispatched on other physical CPUs, provided no virtual CPUs have exclusive affinity to such other physical CPUs.

In addition, when an executing virtual machine has its latency sensitivity indicator dynamically set to Y and its entitlement dynamically set to a maximum percentage value, kernel scheduler 135 detects (or is informed of) these configuration changes. Further, kernel scheduler 135 detects (or is informed) when a virtual machine having its latency sensitivity indicator previously set to Y and its entitlement previously set to a maximum percentage is powered on. In either case, kernel scheduler 135 takes steps to allocate the required number of physical CPUs to the virtual machine's virtual CPUs. Thus, if all physical CPUs are executing tasks at the time the virtual machine is powered on (or, alternatively, at the time the latency sensitivity indicator and entitlement of the virtual machine are changed), kernel scheduler 135 migrates an executing task from one physical CPU to another physical CPU. Kernel scheduler performs this migration for as many physical CPUs as the number of virtual CPUs of the virtual machine. Thus, when the virtual machine's virtual CPUs have tasks that need to be executed, the tasks are executed directly on the allocated physical CPUs without incurring any scheduling or context-switching overhead. In addition, according to embodiments, kernel scheduler 135 ensures that a minimum number of physical CPUs are available for processing the tasks for non-highly latency sensitive virtual machines. In these embodiments, if powering on and allocating a number of physical CPUs to a highly latency sensitive virtual machine would result in the number of physical CPUs available for processing non-highly latency sensitive tasks to fall below this minimum number, then the virtual machine is not powered on.

Figure 3:
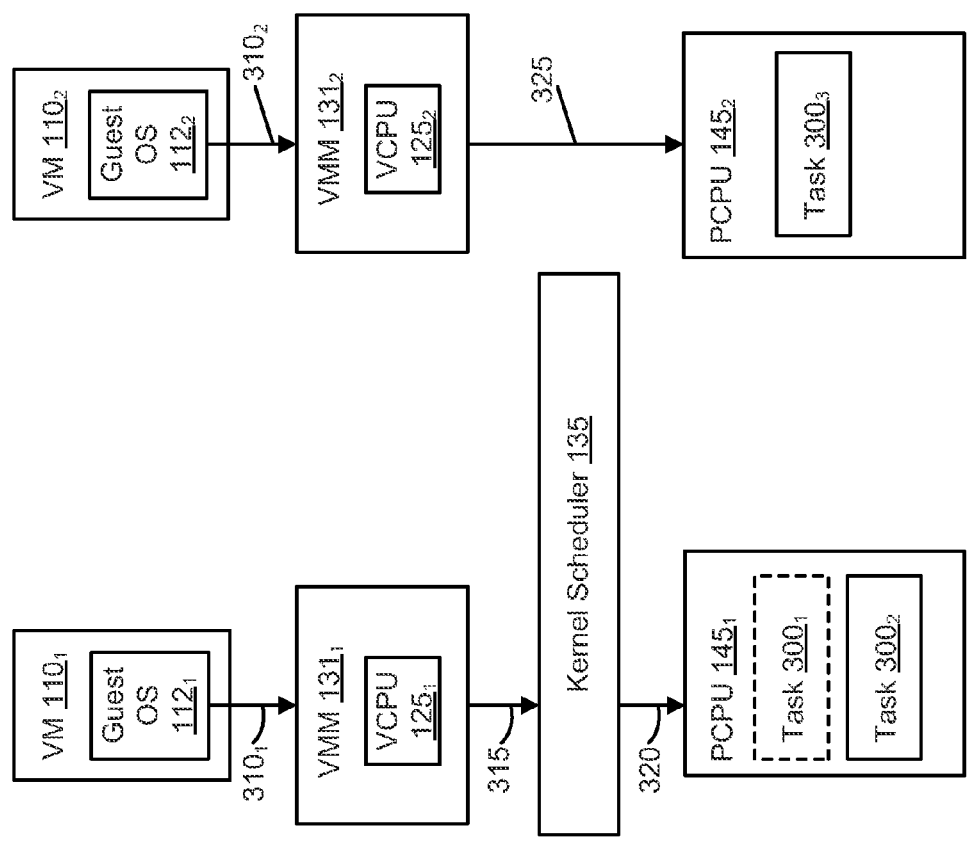
FIG. 3 is a diagram that depicts the processing of a halt instruction issued by a highly latency sensitive virtual machine, according to one or more embodiments.

FIG. 3 is a diagram that depicts the processing of a halt instruction issued by a highly latency sensitive virtual machine, according to one or more embodiments. As previously mentioned, embodiments of the guest operating systems (such as guest OS $112_1$ and guest OS $112_2$) are configured to detect whether the virtual machine has additional tasks to run. If the virtual machine has no additional tasks to run, then a guest operating system in a virtual machine may issue a "virtual" halt instruction. That is, the guest operating system may issue a halt (such as the HLT or MWAIT) instruction to one or more virtual CPUs of the virtual machine. This is done in order to conserve power when the virtual machine is not performing any useful tasks.

When the guest operating system of a virtual machine issues a halt instruction to a virtual CPU, the instruction is received and processed by the corresponding VMM. When the virtual machine is not latency sensitive, then the VMM instructs the kernel to deallocate any physical CPUs previously allocated to executing the halted virtual CPU. This scenario is depicted in FIG. 3, where guest OS $112_1$ running in VM $110_1$ issues a halt instruction (denoted by $310_1$) to halt VCPU $125_1$. It should be noted that, based on information stored in latency sensitivity table 155 depicted in FIG. 2, VM $110_1$ is not a highly latency sensitive virtual machine. This is due to the fact that the latency sensitivity indicator for VM ID $210_1$ (which corresponds to VM $110_1$) is set to N, and because the entitlement value for VM ID $210_1$ is not a maximum value (e.g., 100%). Thus, VMM $131_1$ receives the halt instruction and, in response, makes a kernel call (denoted in FIG. 3 as 315) to communicate to kernel scheduler 135 that VCPU $125_1$ is idle.

In response to kernel call 315, kernel scheduler 135 deallocates from VCPU $125_1$ any physical CPUs on which VCPU $125_1$ is currently executing. This process is denoted in FIG. 3 by arrow 320. For example, assume that, in FIG. 2, task $300_1$ is a task that is currently executing on PCPU $145_1$. Further, task $300_1$ corresponds to VCPU $125_1$. That is, task $300_1$ represents the execution of VCPU $125_1$ on physical CPU PCPU $145_1$. In response to kernel call 315, kernel scheduler 135 deallocates task $300_1$ from executing on PCPU $145_1$ (which is denoted by the dotted line). This frees PCPU $145_1$ to execute other tasks that require CPU resources. As shown in FIG. 3, task $300_2$ is selected by kernel scheduler 135 to execute on PCPU $145_1$. It should be noted that the processing of virtual halt request $310_1$, kernel call 315, and the scheduling task 320 each consumes physical CPU resources, and thus contributes to latency. Further, when VCPU $125_1$ becomes ready to execute a task (by, for example, receiving a soft interrupt), then the VCPU needs to be rescheduled to execute on a physical CPU by kernel scheduler 135, which is a further source of latency.

In contrast with VM $110_1$, VM $110_2$ is a highly latency sensitive virtual machine. This is due to the fact that the latency sensitive indicator for VM ID $210_2$ (which corresponds to VM $110_2$) is set to Y, and because the entitlement value for VM ID $210_2$ is set to a maximum value (i.e., 100%). In this case, when guest OS $112_2$ issues a halt instruction (i.e., an HLT, MWAIT, or equivalent instruction) to VCPU $125_2$, VMM $131_2$ intercepts the instruction. VMM $131_2$ then determines that VM $110_2$ is highly latency sensitive and, therefore, executes in a state where its corresponding VCPUs have exclusive affinity to one or more physical CPUs of computer host 100. For example, in FIG. 3, VMM $131_2$ determines that VCPU $125_2$ executes with exclusive affinity to PCPU $145_2$. Therefore, in order to effectuate the halt of VCPU $125_2$, VMM $131_2$ issues a physical halt instruction (e.g., a physical HLT, MWAIT, or equivalent instruction) to physical CPU PCPU $145_2$. It should be noted that, in the case of latency sensitive VM $110_2$, VMM $131_2$ does not make a kernel call to communicate that VCPU $125_2$ is idle. Rather, the halt instruction is issued directly to PCPU $145_2$, which has the effect of halting task $300_3$ (which corresponds to VCPU $125_2$, and is shown as executing on PCPU $145_2$) without deallocating PCPU $145_2$ from that task. Thus, when VCPU $125_2$ receives an interrupt subsequent to receiving the halt instruction, PCPU $145_2$ is able to immediately begin processing for VCPU $125_2$, without any need for kernel scheduler 135 to schedule any corresponding tasks. Thus, the latency that is present for non-latency sensitive VM $110_1$ is absent for latency sensitive VM $110_2$.

Figure 4:
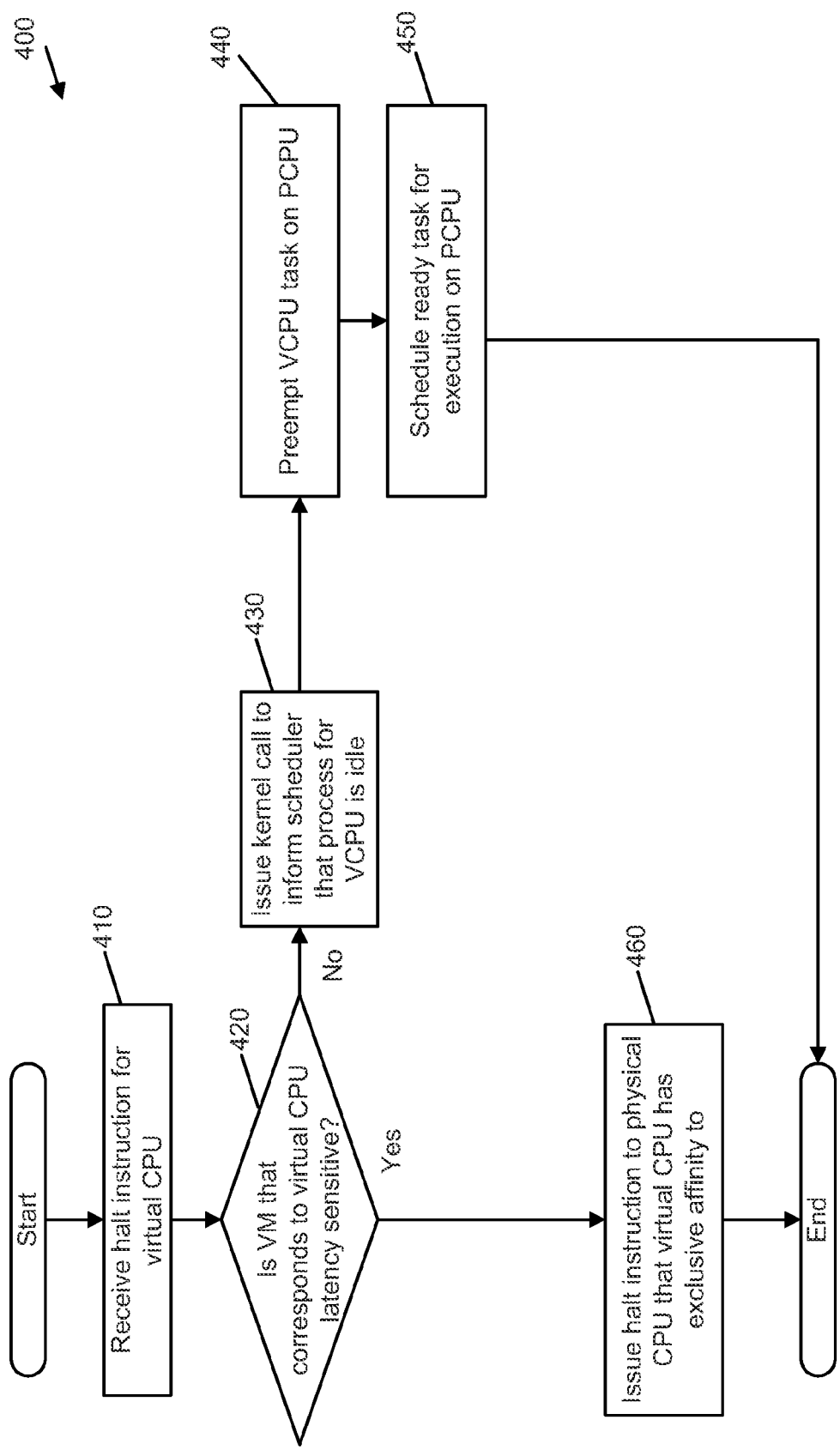
FIG. 4 is a flow diagram depicting a method for halting a virtual CPU of a highly latency sensitive virtual machine, according to one or more embodiments.

FIG. 4 is a flow diagram depicting a method 400 for halting a virtual CPU of a highly latency sensitive virtual machine, according to one or more embodiments. As shown, the steps of method 400 are executed by a virtual machine monitor (such as VMM $131_1$ or VMM $131_2$, depicted in FIG. 3) and by a kernel scheduler (such as kernel scheduler 135). Method 400 begins at step 410, where a VMM for a virtual machine receives a halt instruction for a virtual CPU of the virtual machine. As previously mentioned, the halt instruction may be the HLT or MWAIT instructions of the x86 processor architecture, or any equivalent instruction that halts execution of the processor.

Next, at step 420, the VMM determines whether the VMM corresponds to a virtual machine that is highly latency sensitive. According to one or more embodiments, the VMM determines the latency sensitivity of the corresponding virtual machine by examining an entry in a latency sensitivity data structure (such as, for example, latency sensitivity data 143, which is based on latency sensitivity table 155). If the VMM determines that the virtual machine that issued the received halt instruction is highly latency sensitive, then method 400 proceeds to step 460.

At step 460, the VMM issues a halt instruction to the virtual CPU, which has exclusive affinity to one of the physical CPUs of the host computer. Thus, the halt instruction issued to the virtual CPU has the effect of directly halting the physical CPU on which the halted virtual CPU executes. Further, the halting of the physical CPU is performed without issuing a kernel call. After step 460, method 400 terminates.

If, however, the VMM determines, at step 420, that the virtual machine that issued the halt instruction for the virtual CPU is not highly latency sensitive, then method 400 proceeds to step 430. At step 430, the VMM issues a kernel call that informs the kernel scheduler (such as kernel scheduler 135 depicted in FIG. 1) that the task that corresponds to the virtual CPU is now idle. It should be noted that, from the standpoint of the hypervisor and the kernel scheduler, a virtual CPU is a task to be executed, rather than a physical processor.

In response to the kernel call made by the VMM at step 430, the kernel scheduler, at step 440, preempts the task that corresponds to the virtual CPU. That is, the kernel scheduler halts the task that corresponds to the virtual CPU. According to embodiments, the kernel scheduler saves the state of the virtual CPU task and queues that task for future execution at such time that the virtual CPU is not in an idle state.

Next, at step 450, the kernel scheduler schedules for execution another task on the physical CPU from which the virtual CPU task was preempted from execution on. This other scheduled task may be another virtual CPU that is not idle, a user program, an operating system process, or an interrupt handler. Once the other task is scheduled for execution on the physical CPU, method 400 terminates.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a host computer having a virtualization software that supports execution of a plurality of virtual machines, the virtualization software including a virtual machine monitor for each of the virtual machines, wherein each virtual machine monitor emulates a virtual central processing unit (CPU) for a corresponding virtual machine, a method of halting execution of a virtual CPU of a virtual machine, the method comprising:

receiving a first halt instruction at a virtual machine monitor from a corresponding virtual machine;

determining by the virtual machine monitor whether the virtual machine is latency sensitive;

if the virtual machine is latency sensitive, then issuing from the virtual machine monitor a second halt instruction to halt a physical CPU on which the virtual CPU executes; and if the virtual machine is not latency sensitive, then executing a system call to a kernel executing on the host computer to indicate to the kernel that the virtual CPU is in an idle state.

2. The method of claim 1, wherein the first halt instruction is issued by a guest operating system executing in the virtual machine.

3. The method of claim 1, wherein, if the virtual machine is latency sensitive, then the virtual CPU executes in an exclusive mode on the physical CPU.

4. The method of claim 1, wherein determining whether the virtual machine is latency sensitive comprises:
   reading a latency sensitivity indicator for the virtual machine;
   reading a CPU entitlement value for the virtual machine;
   determining whether the latency sensitivity indicator is a predetermined value; and
   determining whether the CPU entitlement value is a maximum value.

5. The method of claim 1, wherein the system call is made to a kernel CPU scheduler.

6. The method of claim 5, wherein the kernel CPU scheduler, in response to the system call, deschedules the virtual CPU.

7. The method of claim 6, wherein, in response to the system call, the kernel CPU scheduler deallocates the physical CPU from the virtual CPU and allocates the physical CPU to other tasks.

8. A non-transitory computer-readable medium comprising instructions executable by a host computer, the host computer having a virtualization software that supports execution of a plurality of virtual machines, the virtualization software including a virtual machine monitor for each of the virtual machines, wherein each virtual machine monitor emulates a virtual central processing unit (CPU) for a corresponding virtual machine, where the instructions, when executed, cause the host computer to perform method of halting execution of a virtual CPU of a virtual machine, the method comprising:
   receiving a first halt instruction at a virtual machine monitor from a corresponding virtual machine;
   determining by the virtual machine monitor whether the virtual machine is latency sensitive;
   if the virtual machine is latency sensitive, then issuing from the virtual machine monitor a second halt instruction to halt a physical CPU on which the virtual CPU executes; and
   if the virtual machine is not latency sensitive, then executing a system call to a kernel executing on the host computer to indicate to the kernel that the virtual CPU is in an idle state.

9. The computer-readable medium of claim 8, wherein the first halt instruction is issued by a guest operating system executing in the virtual machine.

10. The computer-readable medium of claim 8, wherein, if the virtual machine is latency sensitive, then the virtual CPU executes in an exclusive mode on the physical CPU.

11. The computer-readable medium of claim 8, wherein determining whether the virtual machine is latency sensitive comprises:
   reading a latency sensitivity indicator for the virtual machine;
   reading a CPU entitlement value for the virtual machine
   determining whether the latency sensitivity indicator is a predetermined value; and
   determining whether the CPU entitlement value is a maximum value.

12. The computer-readable medium of claim 8, wherein the system call is made to a kernel CPU scheduler.

13. The computer-readable medium of claim 12, wherein the kernel CPU scheduler, in response to the system call, deschedules the virtual CPU.

14. The computer-readable medium of claim 13, wherein, in response to the system call, the kernel CPU scheduler deallocates the physical CPU from the virtual CPU and allocates the physical CPU to other tasks.

15. A virtualized computing system, comprising:
   a host computer having a virtualization software that supports execution of a plurality of virtual machines;
   a kernel scheduler; and
   a virtual machine monitor for each of the virtual machines, wherein each virtual machine monitor emulates a virtual central processing unit (CPU) for a corresponding virtual machine, wherein each virtual machine monitor is configured to perform a method of halting execution of a virtual CPU of a virtual machine, the method comprising:
   receiving a first halt instruction at a virtual machine monitor from a corresponding virtual machine;
   determining by the virtual machine monitor whether the virtual machine is latency sensitive;
   if the virtual machine is latency sensitive, then issuing from the virtual machine monitor a second halt instruction to halt a physical CPU on which the virtual CPU executes; and
   if the virtual machine is not latency sensitive, then executing a system call to a kernel executing on the host computer to indicate to the kernel that the virtual CPU is in an idle state.

16. The system of claim 15, wherein the first halt instruction is issued by a guest operating system executing in the virtual machine.

17. The system of claim 15, wherein, if the virtual machine is latency sensitive, then the virtual CPU executes in an exclusive mode on the physical CPU.

18. The system of claim 15, wherein determining whether the virtual machine is latency sensitive comprises:
   reading a latency sensitivity indicator for the virtual machine;
   reading a CPU entitlement value for the virtual machine
   determining whether the latency sensitivity indicator is a predetermined value; and
   determining whether the CPU entitlement value is a maximum value.

19. The system of claim 15, wherein the system call is made to a kernel CPU scheduler.

20. The system of claim 19, wherein the kernel CPU scheduler, in response to the system call, deschedules the virtual CPU, deallocates the physical CPU from the virtual CPU, and allocates the physical CPU to other tasks.

* * * * *